Jan. 11, 1938.   A. A. BERNDT   2,105,178
CONNECTER
Filed June 11, 1936
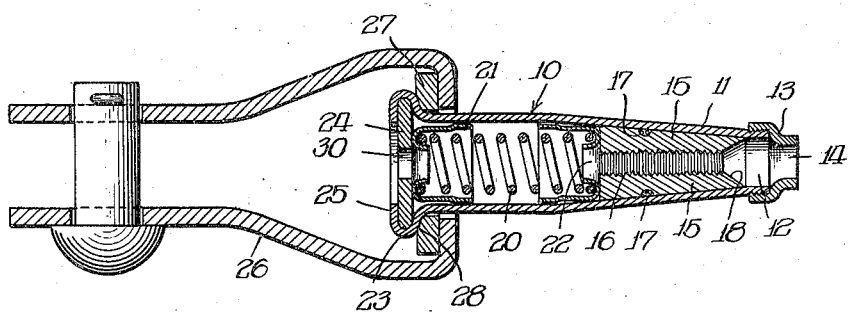
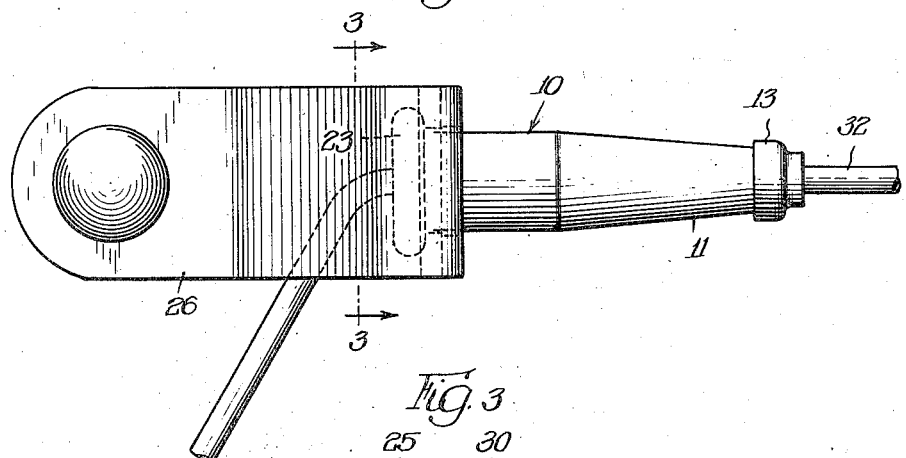
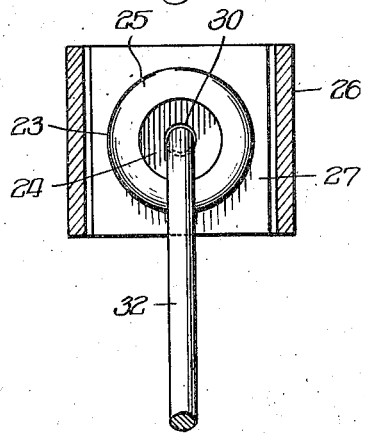
Inventor:
Arthur A. Berndt.
By Wilkinson, Huxley, Byron & Knight
Attys.

Patented Jan. 11, 1938

2,105,178

UNITED STATES PATENT OFFICE 2,105,178

CONNECTER

Arthur A. Berndt, Chicago, Ill., assignor to Electroline Company, Chicago, Ill., a corporation of Illinois Application June 11, 1936, Serial No. 84,651

3 Claims. (Cl. 173—251)

The invention relates to connecters and has reference particularly to a dead-end connecter for joining a wire to an insulator or for anchoring a wire to a fixed support.

An object of the invention is to provide a connecter for securely joining a wire such as a conductor guide or stay wire to an insulator or to a fixed anchorage. The connecter of the invention is characterized by the ease with which it can be assembled, installed and a connection with the wire completed, and further, by the fact that the joint is as strong as the wire and will withstand excessive vibration without failing.

A more specific object is to provide a dead-end connecter that can be joined to a wire without requiring tools of any kind, which will be of simple and compact construction and which will have the wire gripping parts enclosed so that they can not become lost.

A further object is to provide a dead-end connecter of novel construction for joining a wire or conductor to an anchorage and which will have an end portion of enlarged diameter providing an abutment for attaching the connecter to said anchorage.

A further object is to provide a dead-end connecter that will permit movement of the wire through the connecter in the direction to take up slack in the wire but which will prevent movement of the wire in an opposite direction.

Another object is to provide a connecter having gripping members actuated by resilient means and which will permit passage of the wire through the connecter for taking up slack although compression of the resilient means to the extent which would cause the resilient means to take a permanent set is effectively prevented.

With these and various other objects in view the invention may consist of certain novel features of construction and operation as will be more fully described and particularly pointed out in the specification, drawing and claims appended hereto.

In the drawing which illustrates an embodiment of the invention and wherein like reference characters are used to designate like parts—

Figure 1 is a sectional view of a dead-end connecter constructed in accordance with the invention and shown in connection with a yoke for attaching the connecter to an anchorage;

Figure 2 is an elevational view of the dead-end connecter shown in Figure 1, showing the same in the act of anchoring a wire; and Figure 3 is a vertical sectional view taken along line 3—3 of Figure 2.

Referring more particularly to the drawing, the dead-end connecter essentially consists of a wire gripping member of similar construction and operating in the same manner as the connecter disclosed and claimed in applicant's copending application Serial No. 15,768, filed April 11, 1935, which has matured into Patent No. 2,082,566. Said member consists of a tubular housing or casing 10 of any suitable metal, preferably copper or an alloy thereof, having a tapering end portion 11 provided with an opening 12 of smaller diameter compared to the size of the cylindrical portion of the casing. Threaded to the end of the tapered portion 11 and enclosing the opening 12 is a cap 13 which is provided with an opening 14 for contacting the wire or conductor joined by the connecter. Located within the casing are a plurality of gripping members 15 which fit within the tapering end portion of the casing and contact the walls thereof. Each gripping member is of wedge-shape formation and is provided with a trough or groove extending lengthwise thereof and suitably roughened by means of the teeth 16. Each member is also provided on its exterior surface with a groove 17 running transversely of the member, said grooves being aligned when the members are assembled within the casing for receiving several strands 17 of spring wire which yieldingly holds the members in associated relation to form a set or group of members. The wire is held by the gripping members due to the fact that the teeth 15 are imbedded into the surface of the wire although not to the extent to cause severe damage thereto. For the purposes of releasing the engaged conductor or wire the ends of the members 15 adjacent the opening 13 are bevelled as at 18. Actually the gripping members are flexibly held together so as to form a small opening preventing free passage of the inserted wire, with the result that the members become associated with the end of the inserted wire.

The means for actuating the gripping members to retain them in contact with the tapering wall of the portion 11 comprise resilient means in the form of a coil spring 20. Said coil spring is located between the gripping members and the closed end of the casing, the construction of which will be presently described. The convolutions of the coil spring have a diameter somewhat less than that of the casing so as to have free movement within the casing and said spring has a length to exert sufficient tension for an operative connecter. The respective ends of the coil spring seat within cup-shaped members 21 provided with an apertured base forming an inwardly directed annular flange 22 and having an exterior surface which increases in diameter from the base to the open end for purposes which will presently appear. The height of each cup-shaped member, that is, the distance from base to rim, is designed to prevent full compression of the coil spring, or at least compression to the extent where said coil spring would take a permanent set. For the present connecter it is necessary to form the coil spring of a non-ferrous metal and although a good grade of metal is used, the spring will take a permanent set if compressed to the point where the convolutions substantially contact each other. By using a pair of cup-shaped members having their open ends directed toward each other said members contact upon the insertion of a wire and prevent excessive compression of the spring. The cup members are therefore of a height which when they contact sufficient play for operation of the gripping members is provided although the spring is not fully compressed.

The diameter of the base portion of each cup-shaped member is considerably less than the interior diameter of the cylindrical portion of the casing, whereas, the diameter of the cup from the center to the rim is somewhat larger and has a slidable fit with said cylindrical portion. The reduced diameter of the base portion of the cup member is necessary as this portion should fit within the tapering end section of the casing when the gripping members are in inoperative position to thereby give maximum longitudinal movement for the spring and gripping members. The large diameter of the cup controls the slidable movement of the same during compression of the spring in the act of inserting the wire.

The casing 11 of the wire gripping member has its left end enlarged in diameter as at 23 for receiving the end plate 24, the metal of said enlarged end being beaded over the end plate forming end retaining flanges 25. The enlarged portion 23 is preferably formed integral with the casing 10 and by beading the end metal over plate 24 a construction is secured that unites the plate to the casing and which cannot be forced out or even loosened by tension placed on the casing when held by yoke 26 as shown.

The dead-end connecter of the invention is attached to a yoke such as 26 or other anchorage by using the enlarged portion 23 as an abutment. The joint between the yoke and connecter may be strengthened by washer 27 which is apertured, having the edges of said opening rounded so as to conform to the contour of shoulder 28 on casing 10. This insures against weakening of the metal of the casing and makes for a stronger connection. In assembling the parts the wire gripping member 10 is inserted through the opening formed in washer 27 and in the yoke 26 and movement of the member continues until the portion 23 of enlarged diameter is brought up solid against the washer.

A wire connected to an anchorage or other support will eventually develop slack and it is desirable that this slack be taken up through the connecter. This is possible with the device of the invention as the cup-shaped members 21 have their base apertured, providing an opening defined by the inwardly directed flange 22. The openings in the base of the cup-shaped members 21 are accordingly in alignment with each other and also with the passage in the gripping members through which the wire is inserted. The end plate 24 is also apertured, providing an opening 30 which is likewise in alignment with the openings in the cup-shaped members. The wire or conductor joined by the present device can be inserted through the casing 10 thereof so that the free end of the wire or conductor will project beyond the end plate 24. As shown in Figure 2 the projecting end of the wire conductor 32 may be bent downwardly where it is accessible to the lineman for taping or for joining a tap conductor thereto.

As previously explained the gripping members become associated with the end of an inserted wire but as the same is forced inwardly, movement of the gripping members will continue in a direction toward the left until the cup members 21 are caused to contact. The wire or conductor will now move relative to the gripping members and its end will pass through openings 22 in the cup-shaped members 21 and through opening 30 in the end plate. Release of the wire will result in movement of the same toward the right for a relatively short distance just sufficient to bring the gripping members into wedging action with the wire to firmly hold the same. The dead end connecter is at all times operative to permit movement of the wire through the connecter for taking up slack in the wire. Movement of the wire in this direction has the effect of releasing the engagement between wire and gripping members, but as soon as tension is placed on the wire and connecter the gripping members are automatically located within the tapering end portions of the casing and gripping of the wire again results to form a secure connection.

What is claimed is:

1. A connecter for connecting wires and the like to an anchorage comprising a wire engaging member, said member including a tubular casing having one end thereof closed by an apertured disc and having its other end reduced in diameter to form a tapering end portion, gripping members within said tapering end portion for gripping and holding a wire, resilient means for maintaining the gripping members in engagement with their tapering walls, cup-shaped members providing seats for the respective ends of said resilient means, one cup-shaped member being located between the gripping members and the resilient means and having an apertured base, and the other cup-shaped member being located between the disc and the resilient means and also having an apertured base, the openings in said cup-shaped members being in alignment with each other and with the opening in said disc.

2. A connecter for connecting wires and the like to an anchorage including means having an opening therein, a wire engaging member fitting within said opening, said member including a tubular casing having one end closed by an apertured plate forming an abutment for engaging the edges of the opening in said means to retain the member and means in connected relation, said casing having its other end reduced in diameter to form a tapering end portion, gripping members housed within the tapering end portion for gripping and holding a wire, a coil spring positioned between the gripping members and said apertured plate, and members providing seats for the respective ends of said coil spring, each member having an opening in its base in substantial alignment with the opening in said plate.

3. In combination, an electrical wire connecter and anchorage means therefor, said connecter and anchorage means having interengaging portions preventing relative movement of one with respect to the other in one direction, said connecter including a hollow casing having a tapering end portion, an apertured plate closing the end of said casing opposite the tapering portion and providing an abutment preventing relative movement of said connecter and anchorage means as above mentioned, gripping members housed within said tapering end portion for gripping and holding the wire, resilient means positioned between the gripping members and said apertured plate, and seat forming members for the respective ends of said resilient means, each having an opening therein in substantial alignment with the opening in said plate whereby said wire gripped by said gripping members may extend therethrough and project beyond the end of the connecter.

ARTHUR A. BERNDT.